United States Patent
Benedikt et al.

(10) Patent No.: US 7,496,571 B2
(45) Date of Patent: Feb. 24, 2009

(54) METHOD FOR PERFORMING INFORMATION-PRESERVING DTD SCHEMA EMBEDDINGS

(75) Inventors: Michael Abraham Benedikt, Chicago, IL (US); Minos N. Garofalakis, Morristown, NJ (US); Rajeev Rastogi, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 114 days.

(21) Appl. No.: 10/955,322

(22) Filed: Sep. 30, 2004

(65) Prior Publication Data

US 2006/0212860 A1    Sep. 21, 2006

(51) Int. Cl.
*G06F 17/30* (2006.01)

(52) U.S. Cl. .................. 707/6; 707/1; 707/2; 707/3; 707/4; 707/5; 707/7; 707/101

(58) Field of Classification Search .......... 707/100, 707/10, 1–7, 101
See application file for complete search history.

(56) References Cited

U.S. PATENT DOCUMENTS

| | | | | |
|---|---|---|---|---|
| 6,718,320 | B1 * | 4/2004 | Subramanian et al. | 707/2 |
| 6,826,568 | B2 * | 11/2004 | Bernstein et al. | 707/6 |
| 2003/0120651 | A1 * | 6/2003 | Bernstein et al. | 707/6 |
| 2003/0167254 | A1 * | 9/2003 | Su et al. | 707/1 |
| 2005/0097084 | A1 * | 5/2005 | Balmin et al. | 707/3 |
| 2005/0102303 | A1 * | 5/2005 | Russell et al. | 707/101 |
| 2005/0160108 | A1 * | 7/2005 | Charlet et al. | 707/101 |
| 2005/0256850 | A1 * | 11/2005 | Ma et al. | 707/3 |
| 2005/0278139 | A1 * | 12/2005 | Glaenzer et al. | 702/179 |

OTHER PUBLICATIONS

D. Shasha et al., "Exact and Approximate Algorithms for Unordered Tree Matching," IEEE Trans. on Systems, Man, and Cybernetics, vol. 24, No. 4, Apr. 1994.*
Balmin et al, "XPath Query Containment for Index and Materialized View Matching", Nov. 11, 2002, pp. 1-12.*
Luccio et al, "Bottom-up Subtree Isomorphism for Unordered Labeled Trees", Universita Di Pisa, Technical Report, Jun. 24, 2004, pp. 1-20.*
Nieman et al, "Evaluating Structural Similarity in XML Documents", University of Michigan, 2002, pp. 1-6.*
Zhang et al, "Fast Serial and Parallel Algorithms for Approximate Tree Matching with VLDC's (Extended Abstract)", University of Western Ontario, Department of Computer Science, 1992, pp. 151-161.*
Chi et al, "Frequent Subtree Mining-An Overview", University of California, 2001, pp. 1001-1038.*
Bertino et al, "A matching algorithm for measuring the structural similarity between an XML document and a DTD and its applications", Dipartimento di Informatica, Universita degli Studi di Pica, 2003, pp. 1-24.*

(Continued)

*Primary Examiner*—Apu M Mofiz
*Assistant Examiner*—Hung D Le

(57) ABSTRACT

Method for performing information-preserving DTD schema embeddings between a source schema when matching a source schema and a target schema. The preservation is realized by a matching process between the two schemas that finds a first string marking of the target schema, evaluates a legality of the first string marking, determines an estimated minimal cost of the first string marking and subsequently adjusts the estimated minimal cost based upon one to one mapping of source schema and target schema subcomponents.

10 Claims, 10 Drawing Sheets

(a) Source Schema $S_1$ (b) Source Schema $S_1'$ (c) Target $S_2$

OTHER PUBLICATIONS

Wang et al, "A System for Approximate Tree Matching", IEEE, 1994, pp. 559-571.*

Miller et al, "The Use of Information Capacity in Schema Integration and Translation", Proceedings of the 19th VLDB Conference, Dublin, Ireland, 1993, pp. 120-133.*

Pekka Kilpelainen, "Tree Matching Problems with Applications to Structured Text Databases", Ph.D. dissertation, Department of Computer Science, University of Helsinki, Finland, 1992, pp. 1-109.*

Kuo-Chung Tai, "The Tree-to-Tree Correction Problem", ACM, North Carolina State University, 1979, pp. 422-433.*

Jason Tsong-Li Wang et al, A System for Approximate Tree Matching, IEEE Transactions on Knowledge and Data Engineering, Apr. 28, 1992, pp. 1-26.*

Erhard Rahm et al, On Matching Schemas Automatically, Universitat Leipzig, 2001, pp. 1-27.*

Dennis Shasha et al, Fast Parallel Algorithms for the Unit Cost Editing Distance Between Trees, Courant Institute of Mathematical Sciences, ACM, 1989, pp. 117-127.*

Christoph M. Hoffmann et al, Pattern Matching in Trees, Purdue University, Indiana, ACM, 1982.*

S. Melnik et al., "Similarity Flooding: A Versatile Graph Matching Agorithm and its Application to Schema Matching," Proc. 18th Intl. Conf. on Data Engineering (ICDE), San Jose CA, 2002.

J. Madhaven et al., "Generic Schema Matching with Cupid," Proceedings of the 27th VLDB Conference, Roma, Italy, 2001.

E. Rahm and P. A. Bernstein, "A Survey of Approaches to Automatic Schema Matching," The VLDB Journal 10: 334-350 (2001)/Digital Object Identified (DOI) 10.1007/s007780100057.

D. Shasha et al., "Exact and Apoproximate Algorithms for Unordered Tree Matching," IEEE Trans. on Systems, Man, and Cybernetics, vol. 24, No. 4, Apr. 1994.

K. Zhang, "On The Editing Distance Between Unordered Labeled Trees," Information Processing Letters 42 (1992), pp. 133-139.

* cited by examiner

FIG. 5 procedure BOTTOMUPESTIMATE($u, v$)
Input: DAG substructure root nodes $u, v$ in the reduced
DTD graphs $R(S_1)$ and $R(S_2 - s_2)$ (respectively).
Output: Estimate $M[u, v]$ of the best cumulative edit distance
of DAG substructures under $u \in R(S_1)$, $v \in R(S_2 - s_2)$.
begin
1. if level($u$) $\neq$ level($v$) or in-degree($u$) $\neq$ in-degree($v$) or
out-degree($u$) $\neq$ out-degree($v$) then
2.    return($\infty$)
3. strings($u$) := set of strings in $S_1$ corresponding to node
$u \in R(S_1)$
4. strings($v$) := set of strings in $S_2 - s_2$ corresponding to
node $v \in R(S_2 - s_2)$
5. let strMatch($u, v$) := optimal complete bipartite matching
between strings($u$), strings($v$) using the string-edit
distance metric of Sec. 3.2 to define edge costs
6. costStrMatch := $\sum_{(s,t) \in \text{strMatch}(u,v)} \text{sdist}(s, t)$
7. if ( out-degree($u$) = out-degree($v$) = 0 ) then
8.    return( costStrMatch )
9. else if ( out-degree($u$) = out-degree($v$) > 0 )
10.    for each node-pair $(x, y) \in$ children($u$) $\times$ children($v$) do
11.      $M[x, y]$ := BOTTOMUPESTIMATE($x, y$)
12.    let childMatch($u, v$) := optimal complete bipartite matching
between children($u$), children($v$) with edge costs defined
by $M[x, y]$ entries
13.    costChildMatch := $\sum_{(x,y) \in \text{childMatch}(u,v)} M[x, y]$
14.    return( costStrMatch + costChildMatch )
15. endif
end

FIG. 7B procedure TopDownAdjust( $R(S_1)$, $R(S_2 - s_2)$, $M[]$ )
Input: Reduced DTD graphs $R(S_1)$ and $R(S_2 - s_2)$, dynamic
  programming array of matching-cost estimates $M[]$ computed
  by BottomUpEstimate.
Output: (Partial) one-to-one mapping Match of nodes of $R(S_1)$
  onto nodes of $R(S_2 - s_2)$, and corresponding cost MatchCost.
begin
1. $u := \text{root}(R(S_1))$
2. $v := $ node of $R(S_2 - s_2)$ such that $M[u, v]$ is minimum
3. Match:= $\{(u, v)\}$
4. MatchCost:= $\text{cost}(\text{relabel}(u, v))$   // no strings at root
5. for each level $i := 1, \ldots, \text{depth}(R(S_1))$ do
6.   matchValues($i$) := $\phi$
7.   for each node $u$ at level $i$ of $R(S_1)$ do
8.     $\text{parents}(u) := $ set of parent nodes of $u$
9.     parentMatches($u$) := $\{v : (w, v) \in \text{Match}, w \in \text{parents}(u)\}$
10.    possMatches($u$) := $\{v \in R(S_2 - s_2) : \text{parents}(v) \supseteq $
                                        parentMatches($u$)$\}$
11.    matchValues($i$) := matchValues($i$) $\cup$
            $\{M[u, v] : v \in \text{possMatches}(u), M[u, v] < \infty\}$
12.   endfor
13.   while matchValues($i$) $\neq \phi$ do
14.     let $(u, v) := $ pair with the *minimum* $M[u, v]$ *value*
                         in matchValues($i$)
15.     delete the $M[u, v]$ entry from matchValues($i$)
16.     matchCost($u, v$) := 0
17.     for each ($w \in \text{parents}(u), x \in \text{parents}(v)$ such
                  that $(w, x) \in $Match) do
18.       $s_w := $ strings for the $w \to u$ edge in strings($u$)
19.       $s_x := $ strings for the $x \to v$ edge in strings($v$)
20.       dist($s_w, s_x$) := optimal complete bipartite matching
           between strings in $s_w, s_x$ using the string-edit
           distance metric of Sec. 3.2 to define edge costs;
21.       matchCost($u, v$) := matchCost($u, v$) + dist($s_w, s_x$)
22.     endfor
23.     if matchCost($u, v$) $< \infty$ then
24.       Match:= Match$\cup\{(u, v)\}$
25.       MatchCost:= MatchCost+ matchCost($u, v$)
26.       delete all entries $M[u, *], M[*, v]$ from matchValues($i$)
27.     endif
28.   endwhile
29. endfor
end

METHOD FOR PERFORMING INFORMATION-PRESERVING DTD SCHEMA EMBEDDINGS

FIELD OF THE INVENTION

The present invention relates to a method for processing XML data, and more particularly, embedding the features and structure of one DTD schema into a second and structurally different DTD schema while preserving the information therein.

DESCRIPTION OF THE BACKGROUND ART

XML (Extensible Markup Language) is a language that has been designed to improve the functionality of the World Wide Web by providing data identification in a more flexible and adaptable manner than previously possible. The term "extensible" is used because the language does not have a fixed format like its predecessor HTML (a single, predefined markup language). Instead, XML is actually a "metalanguage" (a language for describing other languages) which allows a designer the freedom of designing a customized markup language for different types of documents. XML's flexibility is possible because it is written in SGML, the international standard metalanguage for text markup systems (ISO 8879). The result is an extremely simple dialect of SGML which enables generic SGML to be served, received and processed on the Web in the way that is not possible with HTML.

Organization of data in XML is accomplished via a Document Type Definition (DTD) Schema or XML Schema. DTD is a formal description in XML Declaration Syntax of a particular type of document. It establishes what names are to be used for the different types of elements, where they may occur, and how these elements fit together. A DTD provides applications with advance notice of what names and structures can be used in a particular document type. To facilitate usage, there are thousands of DTDs already in existence for a variety of applications.

Schema matching is a problem in many data management applications, including schema evolution and integration, data exchange and data archiving and warehousing. For example, given two database schemas $S_1$ and $S_2$, the goal of the schema-matching process is to effectively identify elements/types in the two schemas that semantically correspond to each other. This process is a critical step, for example, in mapping messages between different formats in E-business applications or identifying points of integration between heterogeneous source schemas and a global, integrated schema (e.g., for web-data integration). Currently, schema matching is a tedious, time-consuming process performed, to a large extent, manually (perhaps supported by a graphical user interface).

Some existing solutions address different forms of the schema matching problem and offer partially automated processes for several application domains. However, none of these earlier efforts has addressed the general problem of matching DTD schemas defined in terms of complex regular expressions containing conjunction, disjunction, and Kleene star operators. Furthermore, most earlier work has ignored the issues of information preservation. Informally, an information-preserving matching of schema S1 to S2 implies that all the information in the S1-structured local database can be transformed losslessly into the integrated schema S2. In other words, a systematic mapping of instances of S1 onto instances of S2 can be obtained without losing any information or structure in the original data. Furthermore, user queries posed over the local S1 schema instances can be effectively translated (based on the underlying schema matching) into equivalent queries over S2 that return exactly the same results. Given the rapidly-growing number of available web data sources as well as the constantly increasing complexity and diversity of the underlying database schemas, there is a need for tools that can effectively automate the schema-matching process.

SUMMARY OF THE INVENTION

Accordingly, we have recognized that there is a need to preserve the information in and the structure of XML data when matching a source schema and a target schema. This can be achieved by schema matching process that finds a first string marking of the target schema, evaluates a legality of the first string marking, determines an estimated minimal cost of the first string marking and subsequently adjusts the estimated minimal cost based upon one to one mapping of source schema and target schema subcomponents. As such, the target schema is effectively reduced to the source schema without losing information or schema structure characteristics. Additionally, this also allows for the translation of queries over the source schema to the target schema.

BRIEF DESCRIPTION OF THE DRAWINGS

The teachings of the present invention can be readily understood by considering the following detailed description in conjunction with the accompanying drawings, in which:

FIG. 6 depicts pseudo code corresponding to the first subroutine seen in FIG. 5;

To facilitate understanding, identical reference numerals have been used, where possible, to designate identical elements that are common to the figures.

DETAILED DESCRIPTION

The problem of information-preserving schema matching for complex XML is addressed by the novel concept of schema embedding. Essentially, schema embedding allows a source DTD to be effectively matched to (or, embedded in) a target DTD while allowing for powerful schema-restructuring transformations that capture data-structuring variations often encountered in practice, and guaranteeing information-preserving instance mappings and effective translation of queries over the source DTD to the target DTD schema.

Schema-restructuring transformations are defined as localized graph-edit operations over a DTD graph to ensure that information is always preserved and that a large class of XML queries can be efficiently transformed to run over the restructured schema. This is accomplished via DTD-embedding algorithms that rely on an appropriately defined concept of edit-distance between DTD graphs. The algorithms take into account apriori semantic knowledge on element tags to compute an appropriate DTD-embedding matching by discovering a low-cost edit-script for transforming the source DTD to the target DTD.

Initially, the nomenclature and modeling of basic DTD-schema is presented. As is known, a DTD is considered to have the form (Ele, P, r) where Ele is a finite set of element types and r is a distinguished type in Ele called the root type. P defines the element types as follows: for each A in Ele, P(A) is a regular expression of the following form:

$$\alpha ::= str | \in | B1, \ldots, Bn | B1 + \ldots + Bn | B*$$

where str denotes PCDATA, $\in$ is the empty word, B is a type in Ele (referred to as a subelement type of A), and '+', ',' and '*' denote disjunction (with n>1), conjunction (i.e., concatenation), and the Kleene star, respectively. The expression A→P(A) is referred to as the production of element type A. Further, it is assumed that all Bi's are distinct in a production. Note that the DTD-schema definition does not lose generality, since all DTDs can be expressed in this form by introducing new element types (entities). As will be shown, matching for general DTDs can be reduced to matching of normalized DTDs. Finally, it is established that A is a conjunctive, disjunctive or star element type if its production P(A) is a conjunctive, disjunctive, or Kleene-star regular expression (i.e., the last three cases in the above generic form) respectively.

Figure 1:
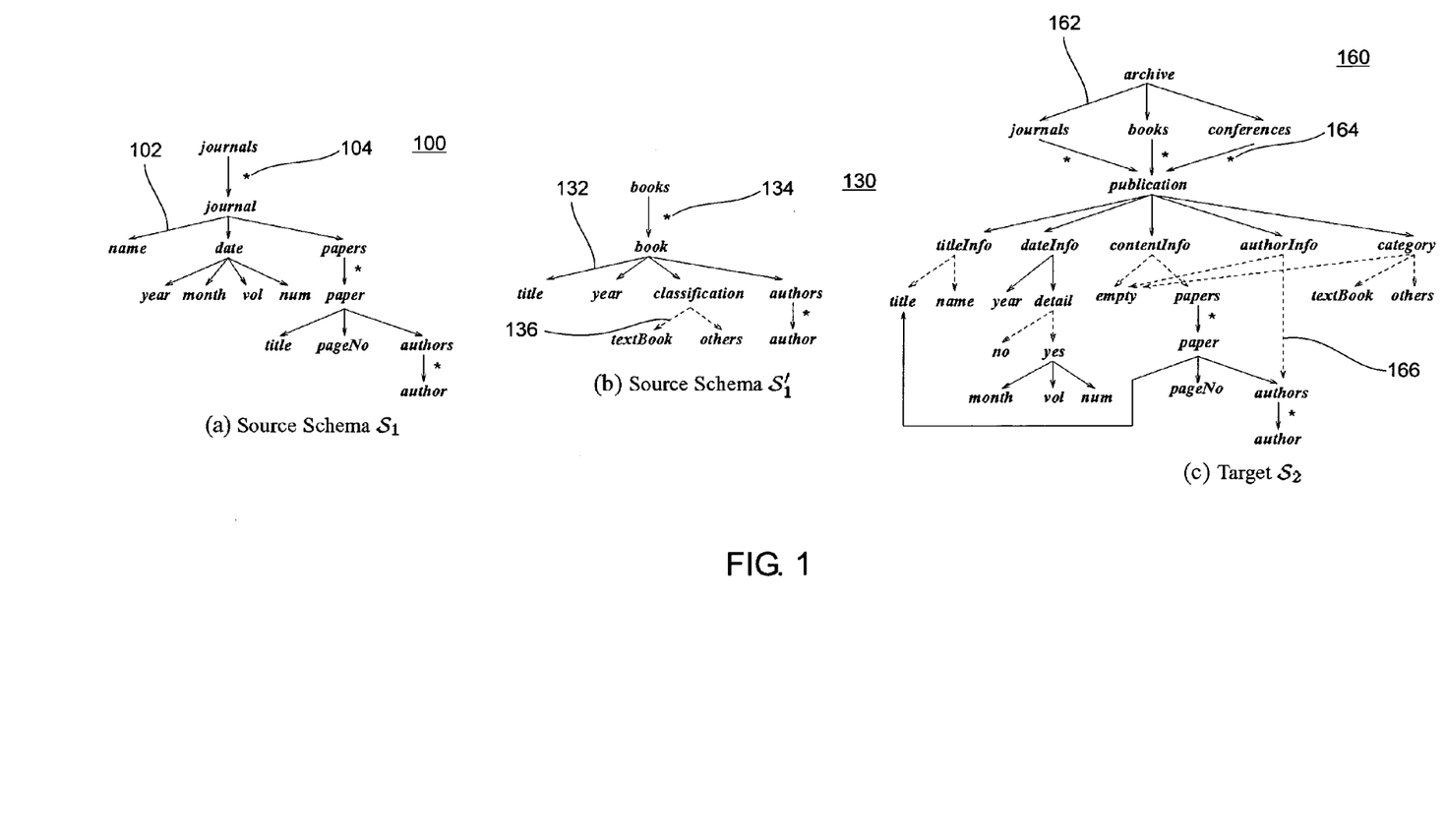
FIG. 1 depicts DTD schemas or graph models associated with the subject invention.

A DTD S is represented as a node-labeled graph, referred to as the graph of S. FIGS. 1(a), 1(b) and 1(c) depict exemplary DTDs for a first source DTD, journal 100, a second source DTD, book 130 and a target DTD, archive 160 DTD respectively. For each element type A in S, there is a unique node labeled A in G, referred to as the A node. From the A-node there are edges to nodes representing subelement types B in α, determined by the production A→α of A. There are different types of edges indicating different DTD constructs. Specifically, the edges are solid lines without labels (102, 132 and 162 in FIG. 1(a), 1(b) and 1(c) respectively) which denote conjunction except the following cases. If α=B*, then the edge has '*' as a label (104, 134 and 164 in FIG. 1(a), 1(b) and 1(c) respectively) indicating that zero or more B elements can be immediately nested within an A element. If α is a disjunction, then the edges are indicated by dashed lines (136 and 166 in FIGS. 1(b) and 1(c) respectively) to distinguish from the case of a concatenation. A node in the DTD graph is characterized as conjunctive, disjunctive, or star node based on the underlying element type. For example, a disjunctive node only has two or more outbound dashed edges and a star node only has a single outbound star edge. A DTD is recursive if its graph is cyclic. When it is clear from the context, the DTD and its graph are used interchangeably, both referred to as S; similarly for A element type and A node.

An XML document instance T of a DTD S is a node labeled tree such that (1) there is a unique node, the root, in T labeled with r; (2) each node in T is labeled either with an Ele type A, called an A element, or with str, called a text node; (3) each A element has a list of children of elements and text nodes such that they are ordered and their labels are in the regular language defined by P(A); and (4) each text node carries a string value (PCDATA) and is a leaf.

As presented earlier, concept of DTD-schema embedding is employed to address the problem of information-preserving DTD-schema matching. Specifically, a source DTD S1=(E1, P1, r1) can be embedded in a target DTD S2=(E2, P2, r2) denoted by S1-<S2, if there exists a function f that maps every element e∈E1 onto an image element $f(e) \in E2$ such that: (1) the "information capacity" of the S2 DTD substructure rooted under the image element f (e) is greater than or equal to the corresponding capacity of the DTD substructure rooted under e and (2) ancestor-descendant relationships are preserved. Intuitively, the above two clauses state that a substructure s of S1 can only be embedded in "larger" substructures of S2 that, essentially, can encompass all the structural information in s, perhaps also introducing some additional structure and DTD elements. As an example, the date element type of our example source schema S1 100 of FIG. 1(a) can be embedded in the dateInfo type of the target schema S2 160 FIG. 1(c) since the dateInfo type just augments date with some additional structural information. The formal definition is as follows:

a source DTD S1=(E1, P1, r1,) can be embedded in a target DTD S2=(E2, P2, r2) (denoted by S1->S2) if and only if there is a function f: E1→E2, and a mapping ann( ), such that ann( ) maps edges (A, B) in S1 to a path ann(A, B) from f(A) to f(B) in the S2 DTD graph, ann(r1) is a path from r2 to f(r1), and for each A∈E1, A'=f(A) satisfying the following conditions:

If A is the root r1 in S1, then ann(A) is a conjunctive path (i.e., a path of only solid lines) from the root r2 of S2 to r1's image node f(r1) in S2.

If P1(A)=str, then P2(A')=str, i.e., the function preserves PCDATA nodes.

If P1(A)=B1, . . . Bl, then f( ) maps each Bi node (i=1, . . . , l) to a distinct image node f(Bi) in S2 such that: (1) f(A) is an ancestor of each $f(Bi)$ and f(Bi) is not an ancestor of f(Bj) for all i≠j∈{1, . . . l} (i.e., ancestor/descendant relationships in S1 are preserved); and, (2) for each pair of distinct image nodes f(Bi) and f(Bj), i≠j their least-common-ancestor lca(f (Bi), f(Bj)) in the S2 graph is a conjunctive node.

If P1(A)=B1+. . . +Bl, then f( ) maps each Bi node (i=1 . . . l) to a distinct image node f(Bi) in S2 such that: (1) f(A) is an ancestor of each f(Bi) and f(Bi) is not an ancestor of f(Bj) for all i≠j∈{1, . . . l} and, (2) for each pair of distinct image nodes f(Bi) and f(Bj), i≠j, their least-common-ancestor lca(f(Bi), f(Bj)) in the S2 graph is a disjunctive node.

If P1 (A)=B*, then there exists a node A" in graph S2 such that (1) there exists a conjunctive path from f(A) to A" that is a prefix of ann(A, B); and, (2) P2(A")=B'* (i.e., A" is a star node in S2) and B'=f(B).

We will refer to the mapping ann( ) as a path annotation. Note that in the case of tree-shaped schemas, ann( ) is completely determined by the embedding function f.

The intuition behind the clauses in the above definition is to (conceptually) allow the nodes of a production in the source DTD schema S, to be mapped, in the general case, to the nodes of a sub-tree in S2 in a manner that preserves the cardinality constraints and semantics imposed by the original S1 production. For example, the embedding definition for a conjunctive production ensures that the target conjunctive sub-tree in S2 maintains the one-to-one semantics of conjunctive edges exactly by ensuring (through the requirement of a conjunctive least-common-ancestor for any two distinct children in the S1 production) that conjunctive ancestor/descendant relationships are preserved, while also allowing for additional structuring information to be included (through the unmapped nodes in the target sub-tree). Thus, the conjunctive production is essentially embedded/included (through f( )) in a substructure of larger "information capacity" in the target DTD. Similarly, the clause for a disjunctive production gives a similar "structure embedding" guarantee for the source production while ensuring that the XOR semantics of the disjunction are preserved. The rationale of the final clause (for star nodes) follows along the same lines.

As mentioned earlier, there may be a multitude of different possible mappings f( ) for embedding a source DTD schema S1 into a target DTD S2. To ensure the semantically best mappings, the subject invention exploits a (partial) label similarity function $\sigma(\ )$ that scores the semantic similarity between individual element types in the two schemas. Such similarity functions for schema-matching problems are typically obtained based on linguistics (e.g., using element names and textual descriptions, substring matching, stemming and tokenization, and so on), or based on auxiliary information (e.g., dictionaries and domain-specific thesauri, user/expert input, or previous matching decisions). Examples of such can be found in "Generic schema matching with cupid" by J. Madhavan, P. A. Bernstein, and E. Rahm In *VLDB*, 2001, "Similarity flooding: A versatile graph matching algorithm", S. Melnik, H. Garcia-Molina, and E. Rahm, In *ICDE*, 2002 and E. Rahm and "A survey of approaches to automatic schema matching" by P. A. Bernstein. *VLDB Journal*, 2001 herein all incorporated in their entireties by reference. Therefore, the DTD-schema embedding problem is summarized as follows:

Given: Source and target DTD schemas S1=(E1, P1, r1,) S2=(E2, P2, r2), partial labelsimilarity function $\sigma(\ )$.

Find: A DTD-embedding mapping f: S1→S2 and ann( ) that embeds S1 in S2 and maps edges in S1 to paths in S1 (i.e., S1->S2 via f( ) and ann( ) such that the cumulative similarity of matched element types is maximized; that is, compute $$f(\ ) = \arg \max_{\text{all embeddings } g(\ )} \left\{ \sum_{A \in E_1} \sigma(A, g(A)) \right\}.$$

The DTD-schema embedding algorithms associated with the subject invention build on the concept of edit-distance to capture the quality of an embedding mapping (i.e., the cumulative similarity of matched schema elements). Such concept and mappings for unordered tree matching is found in for example "Exact and Approximate Algorithms for Unordered Tree Matching" by D. Shasha, J. T. L. Wang, K. Zhang, and F. Y. Shih., *IEEE Transactions on Systems, Man, and Cybernetics*, 24(4):668-678, April 1994 and "On the editing distance between unordered labeled trees K", Zhang, R. Statman, and D. Shasha. *Inf. Process. Lett.*, 42:133-139, May 1992. both herein incorporated by reference in their entireties and collectively identified as "Shasha". Generally, the tree-edit distance metric is a natural generalization of the edit distance metric for flat strings as discussed in "Pattern Matching Algorithms" by A. Apostolico and Z. Galil, editors. Oxford University Press, 1997 which is also herein incorporated in its entirety by reference. Three basic edit operations are allowed: (1) relabeling a tree node from u to v (relabel (u,v) simply changes the label of the node from u to v; (2) deleting a node v (delete (v)) deletes node v from the tree moving all its children under its parent in the tree; and, (3) inserting a node v (insert (v)) is the complement of delete (v), that is, it inserts node v under a parent u in the tree moving a subset of u's current children under v. Each such edit operation has an associated cost (cost ( )), typically assumed to be a metric, and the tree-edit distance between two input trees T1 & T2 is the least cumulative cost among all edit-operation sequences that transform T1 into T2. tdist( ) and sdist( ) are used to denote the edit-distance metric for unordered trees and strings, respectively.

Figure 2:
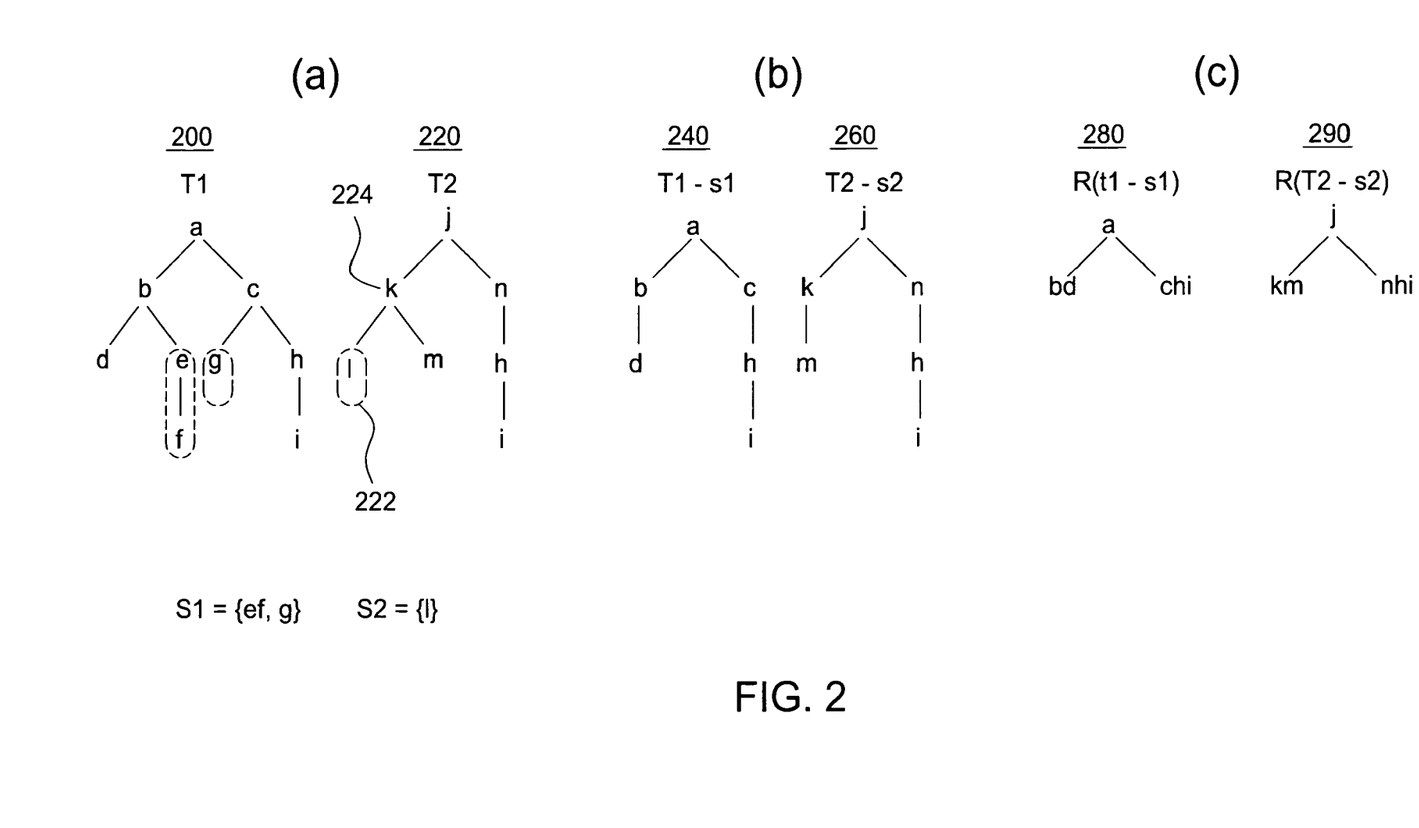
FIG. 2 depicts a plurality of tree structure data graphs associated with the subject invention.

The concept of Shasha's unordered tree matching algorithm is to identify strings of node labels in the two trees (say, T1 & T2) being compared, and enumerate all possible ways of "marking" (i.e., deleting) subsets of these strings from both T1 and T2. A string is formally defined as a maximal sequence of tree nodes starting from a node (termed the head of the string) whose parent is either the root or a node with >1 children, and ending at a node with >1 children (or, a leaf), and each intermediate node has exactly 1 child. Note that a string may very well comprise a single tree node. FIG. 2 depicts two exemplary trees T1 200 and T2 220 associated with the tree-edit distance algorithm. One or more strings of T2 include, e.g., "l" 222, "k" 224, and "nhi" 226. The algorithm iterates over all possible string markings s1 and s2 in T1 and T2 (respectively), where a string marking si is any subset of Ti's strings that are selected for deletion from Ti. For each such pair of string markings, (s1 and s2), the strings in si are deleted from tree Ti (i=1,2) to give the remainder (sub)trees T1-s1 and T2-s2. FIG. 2(b) shows remainder subtrees T1-s1 240 and T2-s2 260, for the string marking (s1,s2) depicted in FIG. 2(a). Finally, all the strings in the T1-s1 and T2-s2 trees are compressed down to a single node yielding the reduced trees corresponding to the (s1,s2) string marking, denoted by R(T1-s1) 280 and R(T2-s2) 290 per FIG. 2(c).

In the tree-matching algorithm of Shasha, each node in the final reduced trees for a marking corresponds to a single sequence of node labels in the original trees. For example, FIG. 2(c) depicts these label sequences ("bd", "chi", etc.) at the leaf nodes of R(T1-s1) and R(T2-s2). Thus, for string markings (s1,s2) resulting in isomorphic reduced trees R(T1-s1) and R(T2-s2), one can easily find the cost of converting (T1-s1) into (T2-s2) using a standard string-edit distance metric between (the label sequences of) corresponding nodes in the reduced trees. Finally, to take into account the cost of string deletions dictated by the given marking, the cumulative tree-edit distance between T1 and T2 for marking (s1,s2) is computed as the summation of three component costs: (1) the cost of deleting all nodes in s1, (2) the total string edit distance between corresponding nodes (i.e., label sequences) in R(T1-s1) and R(T2-s2), and (3) the cost of inserting all nodes in s2; that is, $$tdist(T_1, T_2; (s_1, s_2)) = \sum_{v \in s_1} \text{cost}(\text{delete}(v)) + \sum_{v \in R(T_1-s_1)} sdist(\text{string}(v), \text{string}(i(v))) + \sum_{v \in s_2} \text{cost}(\text{insert}(v)),$$

where i( ) denotes the (isomorphism) mapping between the nodes of R(T1-s1) and R(T2-s2), that results in the smallest overall cumulative string-edit distance. In FIG. 2(c), it is clear that mapping the "chi" node of R(T1-s1) to the "nhi" node of R(T2-s2) results in lower string-edit costs. Given R(T1-s1) and R(T2-s2), this optimal mapping can be found through a bottom-up dynamic-programming search of Shasha. By searching through all possible string markings for the original trees T1 and T2 and selecting the marking (and corresponding reduced-tree mapping) resulting in the minimum overall cost, the Shasha algorithm computes the exact tree-edit distance between T1 and T2. The overall complexity of the algorithm is dominated by the number of possible string markings to be searched.

Exact Embedding Algorithm for Tree-Structured DTDs

Consider a source DTD S1 and a target DTD S2 having DTD graphs that are tree-structured. As discussed earlier, the inventive concept of DTD embeddings is based on trying to embed all nodes of the source schema S1 into "larger" substructures of the target schema S2. Accordingly, this means that only string markings s2 in the S2 tree need to be considered, since nodes from the smaller source schema S1 will not be deleted. Similarly, for a given marking s2 of S2, when comparing the strings of corresponding nodes (u and v) in the reduced trees R(S1) and R(S2-s2) it is required that |string(u)| ≦ |string(v)|, i.e., the string on the S2 side is at least as long as that of S1, by setting the string-edit distance sdist(string (u),string(v)) equal to ∞ otherwise. Furthermore, since the ultimate goal is to maximize the cumulative similarity of matching element types in S1 and S2, the cost of both insertion operations on string(u) and deletion operations on string (v) (the only possible inserts/deletes) is set equal to zero. On the other hand, the cost of a relabeling operation is computed based on the labelsimilarity σ( ) of the corresponding element types as well as the type of their corresponding DTD production (i.e., conjunctive, disjunctive or star). Specifically, given two element types A∈string(u) and B∈string(v), the following is defined:

$$\text{cost}(\text{relabel}(A, B)) = \begin{cases} 1 - \sigma(A, B), & \text{if both A and B are} \\ & \text{conjunctive, disjunctive, or star} \\ & \text{elements in } S_1, S_2 - s_2 \text{ (resp.)} \\ \infty, & \text{otherwise.} \end{cases}$$

That is, for a given string marking s2 of the target DTD S2, elements of S1 are mapped onto elements with the same production type (i.e., conjunctive, disjunctive, or Kleene star) in S2-s2. However, the procedure for marking DTD strings in S2 (outlined below) enables embedding mappings that can potentially match elements with different production types as well.

Assuming, tree-structured DTDs, the definition of strings for the marking of the DTD graph S2 is identical to that of Shasha: a string in S2 is a maximal sequence of nodes starting from a node whose parent has an out-degree >1 (or, the root of the tree) and ending in a node with out-degree >1 (or, a leaf) with all intermediate nodes having an out-degree=1. Each marking represents a modification of S2, with the correspondence identical to that of Shasha: marking a string of S2 means that nodes are selected for deletion from the S2 graph. Additionally, the subject invention's string-marking procedure needs to account for the semantics of different DTD constructs and ensure that the resulting S2-s2 graph represents a valid DTD in normal form. Therefore a string marking s2 of the target DTD graph S2 is DTD-legal if and only if during a bottom-up deletion of nodes in strings of s2 there cannot be a situation where, after deleting all marked string nodes at levels ≧i, a node v at level i-1 satisfies one of the following: (1) the production for v does not satisfy the DTD normal form (e.g., contains both conjunctive and disjunctive edges); or, (2) v was originally a conjunctive (disjunctive) node before the deletions at level i and, as a result of these deletions, two or more disjunctive (resp., conjunctive) nodes have been merged into v.

Intuitively, clause (1) in the above definition ensures that the invention remains within the assumed DTD normal form, whereas clause (2) guarantees that the disjunctive/conjunctive semantics of the original S2 DTD are not lost during the string marking/deletion process. Note that, merging ≧2 disjunctive (conjunctive) nodes into a node of S2 that was originally conjunctive (resp., disjunctive) would cause the original DTD semantics to be lost; for example, when merging a pair of disjunctive children into a conjunctive node v creates a "larger" disjunctive production at v but, clearly, the XOR ("one-and-only-one") semantics of this production is not present in the original DTD.

Consider a source-target DTD pair (S1 and S2) and assume that both DTD-graphs are trees. An inventive EXACT-TREEMATCH algorithm for tree-structured DTDs in accordance with the present invention is presented in FIG. 3. Specifically, the EXACTTREEMATCH algorithm is depicted as a series of method steps 300 to perform the operation of finding a Minimum Cost Embedding Match value (M) to map (embed) S1 into S2. The method starts at step 302 and proceeds to step 304 where a first string marking s of the Target DTD (e.g. Target DTD S2 160 of FIG. 1) is found. At step 306, the method decides if the first string marking s is DTD-legal. The above-identified rules and semantics for DTD-legality provide the framework for making the decision. If the first string s is not DTD-legal, the method loops back to find another string marking s of Target S2 to reinitiate the overall cost determination.

Figure 3:
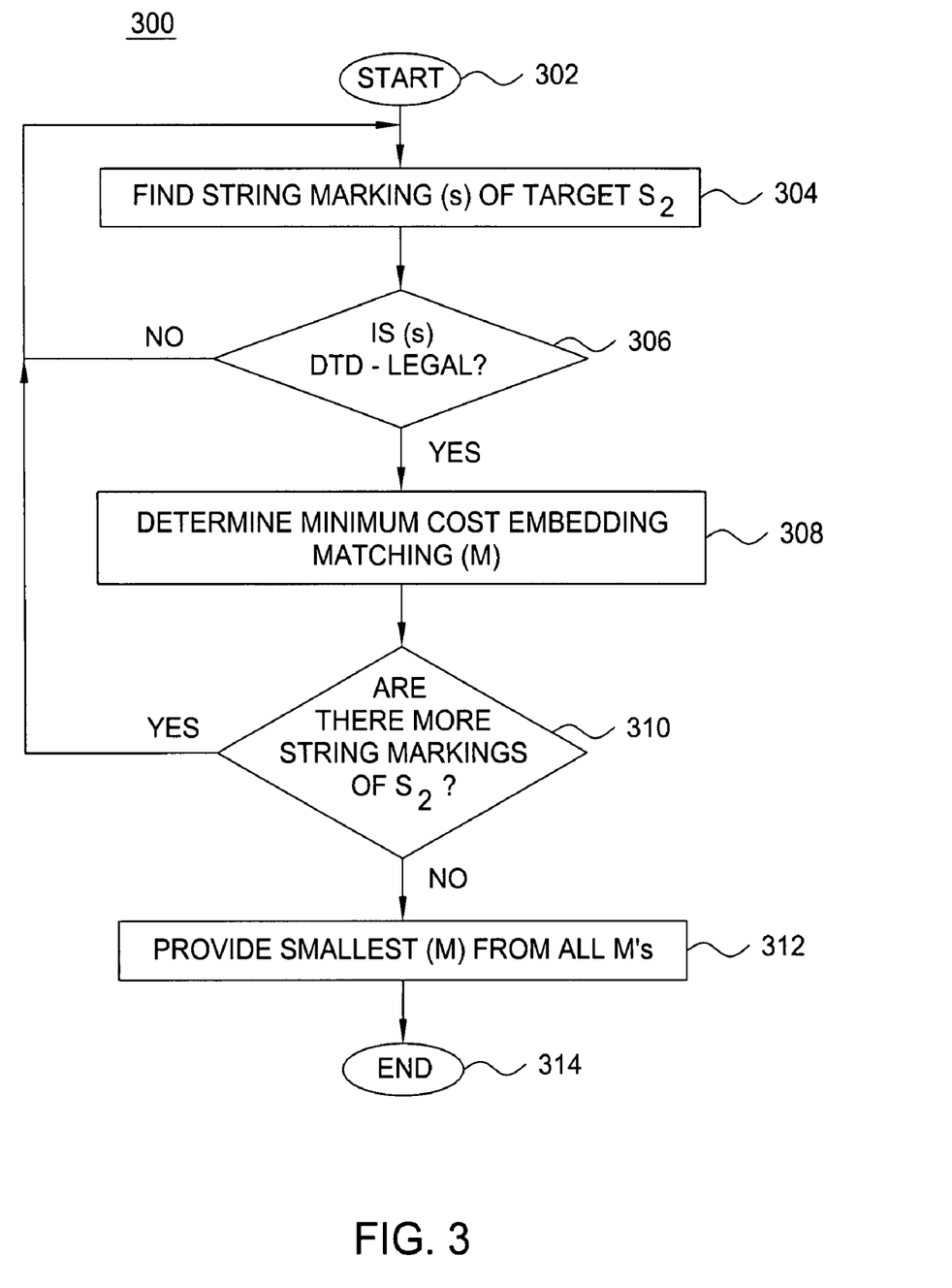
FIG. 3 depicts a flowchart of a first method for performing information-preserving DTD schema embeddings for tree-structured DTDs in accordance with the subject invention.

If the first string s is DTD-legal, the method proceeds to step 308 where a determination of the Minimum Cost Embedding Match value (M) is made. In one embodiment of the invention, M is determined by operating the tree-edit algorithm of Shasha on S1, S2-s and using a string-edit distance metric that abides by the DTD embedding strategy. For example, the one strategy discussed requires that |string(u)| ≦ |string(v)|, i.e., the string on the S2 side is at least as long as that of S1, by setting the string-edit distance sdist(string (u),string(v)) equal to ∞ otherwise. Other metrics may be possible and derived by those skilled in the art to achieved the desired results.

Once a value for M is determined based on the first string marking s (or a suitable DTD-legal s following an illegal first string marking), the method proceeds to step 310 where a determination is made as to whether there are additional string marking s of Target DTD S2. If there are additional string markings, the method loops back to step 304 to continue the DTD-legality and cost determination of the additional string markings. If there are no additional string markings, the method proceeds to step 312 where an final value of M is returned. Specifically, the smallest value of M from each of the earlier determinations of M from step 308 is held until there are no additional string markings left to process (step 310). The smallest value M is then provided and a mapping of the source DTD to the target DTD can be performed via function f based on the provided cost M. The method ends at step 314.

Approximate Embedding Algorithm for DAG-structured DTDs

While the EXACTTREEMATCH algorithm 300 does provide the desired results for very simple tree-structured DTD schemas, its effectiveness is limited with respect to Directed Acyclic Graph (DAG) DTDs. Applying EXACT-TREEMATCH (by splitting nodes with in-degree >1 to expand the DAGs into trees) results in the complexity of such a scheme becoming doubly-exponential in the original DTD DAGs. Additionally, since original DAG nodes are split into several copies, the element-mapping resulting from such a solution can be, in general, many-to-many thus violating one of the key properties of the embedding. Thus, for the general case of DAG-structured DTDs, a novel approximation algorithm APPROXDAGMATCH reveals a satisfactory DTD-embedding mapping working directly off the DTD DAG structures.

Figure 4:
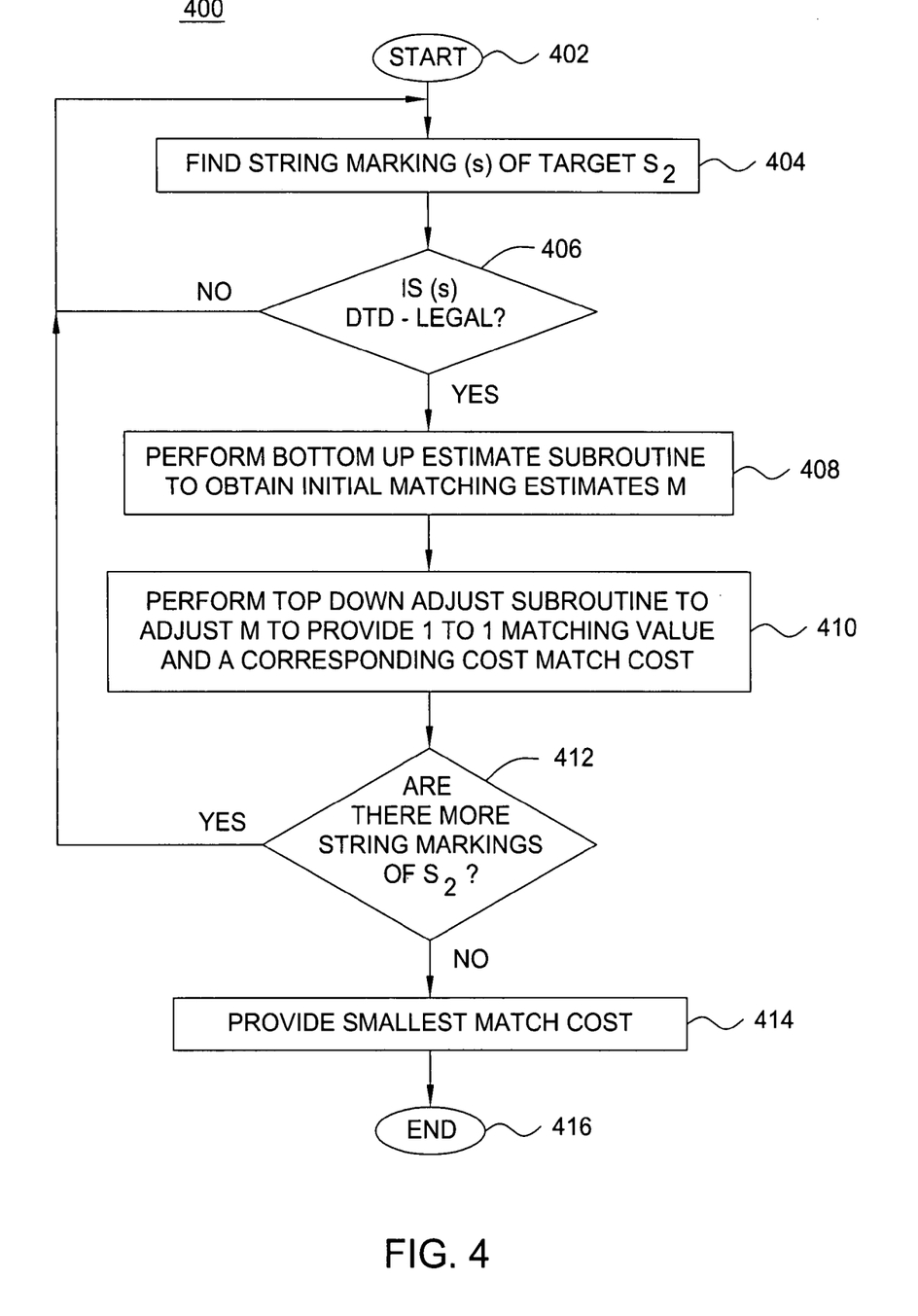
FIG. 4 depicts a flowchart of a second method for performing information-preserving preserving DTD schema embeddings for DAG-structured DTDs in accordance with the subject invention.

FIG. 4 depicts the algorithm APPROXDAGMATCH as a series of method steps 400. Similar to EXACTTREEMATCH 300, APPROXDAGMATCH 400 is based on edit-distance computations. Upon starting at step 402, the method exhaustively explores all DTD-legal string markings of the target DTD graph S2, where a string in the DAG structure is defined in a manner similar to the tree case discussed above and first found at step 404 and its legality determined at step 406. Except that a string in this DTD ends at either sink nodes or nodes that have indegree or out-degree >1 in the S2 DAG. Note that markings are defined directly on the DAG structure rather than the corresponding "expanded" tree.

A key differentiation between string markings in DAGs and trees is that, for DAGs, each node v with in-degree >1 is potentially associated with a set of distinct strings terminating at v. Given a (DTD-legal) string marking s2 of the S2 DAG and the corresponding reduced DAGs, R(S1) and R(S2-s2), the APPROXDAGMATCH algorithm 400 takes this fact into account during a bottom-up dynamic-programming pass over the two reduced DAG structures at step 408. This step produces an estimate M for the cost of the s2 marking. The result is to define an appropriate metric for the "best" edit distance between sets of strings corresponding to reduced-graph nodes based on a minimum-cost complete bipartite matching. However, since predictions based on such localized minimum-cost matchings represent a "best-possible" case for the final marking cost, the APPROXDAGMATCH algorithm 400 then performs a second top-down pass at step 410 during which the true mapping between nodes of S1 and S2-s2 is fixed and the corresponding cost MATCHCOST for the marking is finalized.

Similar to EXACTTREEMATCH 300, once a value for MATCHCOST is determined based on the first string marking s (or a suitable DTD-legal s following an illegal first string marking), the method proceeds to step 412 where a determination is made as to whether there are additional string marking s of Target DTD S2. If there are additional string markings, the method loops back to step 404 to continue the DTD-legality and cost determination of the additional string markings. If there are no additional string markings, the method proceeds to step 414 where an final value of MATCHCOST is returned. Specifically, the smallest value of MATCHCOST from each of the earlier determinations of from steps 408 and 410 is held until there are no additional string markings left to process. The smallest value MATCHCOST is then provided. The method ends at step 416.

Figure 5:
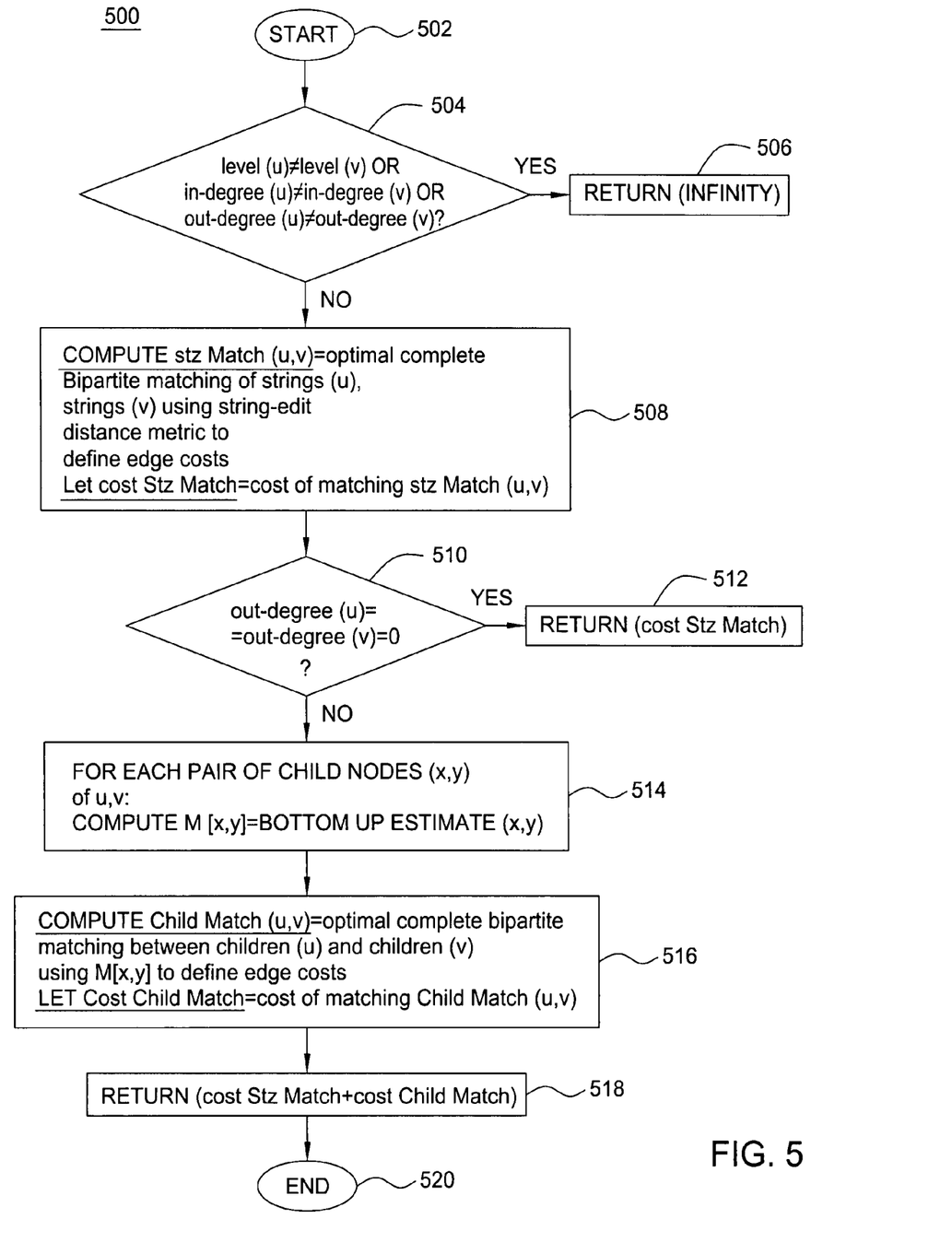
FIG. 5 depicts a flowchart detailing a first subroutine of the second method seen in FIG. 4.

The Bottom-Up EstimateSubroutine (Dynamic-Programming Procedure) 408 is seen in greater detail in FIG. 5 as method steps 500 and one example of practicing same is seen in the corresponding pseudo code in FIG. 6. Given a DTD-legal marking s2 of S2 and the corresponding reduced DTD DAGs, the bottom-up pass produces an estimate for the cost of the s2 marking at the DAG roots. The bottom-up procedure works level-by-level, starting from sink nodes that are the farthest from the DAG root (i.e., the level of a node is its distance from the root of the DTD), and works by filling in the entries of a two-dimensional dynamic programming array M□, where M[u,v] denotes an estimate for the best cumulative edit distance of the two DAG substructures rooted at the two same-level nodes u∈R(S1) and v∈R(S2-s2). The initial invocation of this recursive algorithm is done with u=root(R (S1)) and v=root (R(S2-s2)). The BOTTOMUPESTIMATE procedure starts at step 502 and proceeds to step 504 by checking that the two input nodes are at the same level and also that their in- and out-degrees match. If not, a cost of ∞ is returned at step 506 since they cannot be mapped to each other. For nodes meeting the level and degree conditions, the BOTTOMUPESTIMATE procedure moves to step 508 and produces an estimate of the cost of matching the sets of strings corresponding to nodes u and v in the reduced graphs (remember that, for DAGs, each node in S1, S2-s2 can be the termination point for multiple strings). This cost estimate is computed by finding the optimal complete bipartite matching between the two string sets using edge costs defined by the string-edit distance metric discussed earlier (for example with respect to EXACTTREEMATCH 300) (also see Steps 5-6 of FIG. 6).

Next, out-degree values for u and v are compared to zero at step 510. If the condition is true, the method returns the value of cost matching the above bipartite matching at step 512. If the condition is false, the method proceeds to steps 514 and 516 whereby a second complete bipartite matching problem is solved to determine the best possible way of matching the input nodes' children using the recursively-computed (and tabulated) cost estimates M[x,y] (see also Steps 10-14 of FIG. 6). The appropriate cost estimate is then returned at step 518 and the method ends at step 520.

The final cost estimate for the marking of the S2 DTD computed by the BOTTOMUPESTIMATE 500 procedure may not be attainable through a one-to-one mapping of the nodes in R(S1) onto those of R(S2-s2). The problem is that that BOTTOMUPESTIMATE 500 estimates the cost for matching DAG substructures rooted at each node in level i independently of other DAG nodes, by assuming the best-case bipartite matching for these child substructures (Step 12 in algorithm BOTTOMUPESTIMATE). In general, such DAG substructures are not independent and nodes may be shared, leading to situations where these locally-optimal matchings are incompatible with a one-to-one mapping of DAG nodes. The goal of the second and final step of our APPROXDAGMATCH algorithm 400 (TOPDOWN ADJUST) is to resolve such conflicts by performing a top-down pass over the reduced input graphs, and fixing the final one-to-one matching for the DTD embedding as well as the corresponding marking cost.

Figure 7A:
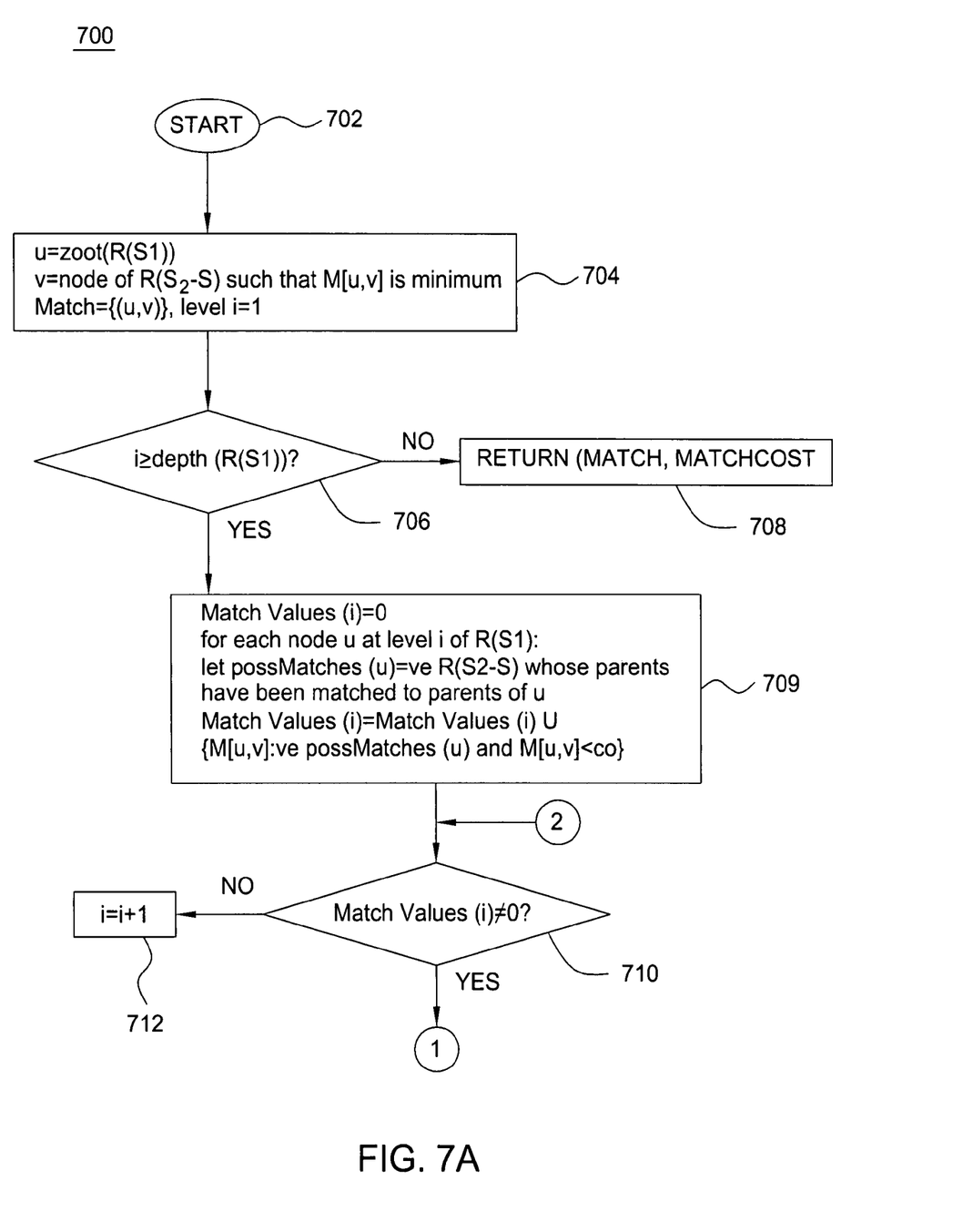
FIG. 7 a flowchart detailing a second subroutine of the second method seen in FIG. 4.
Figure 7B:
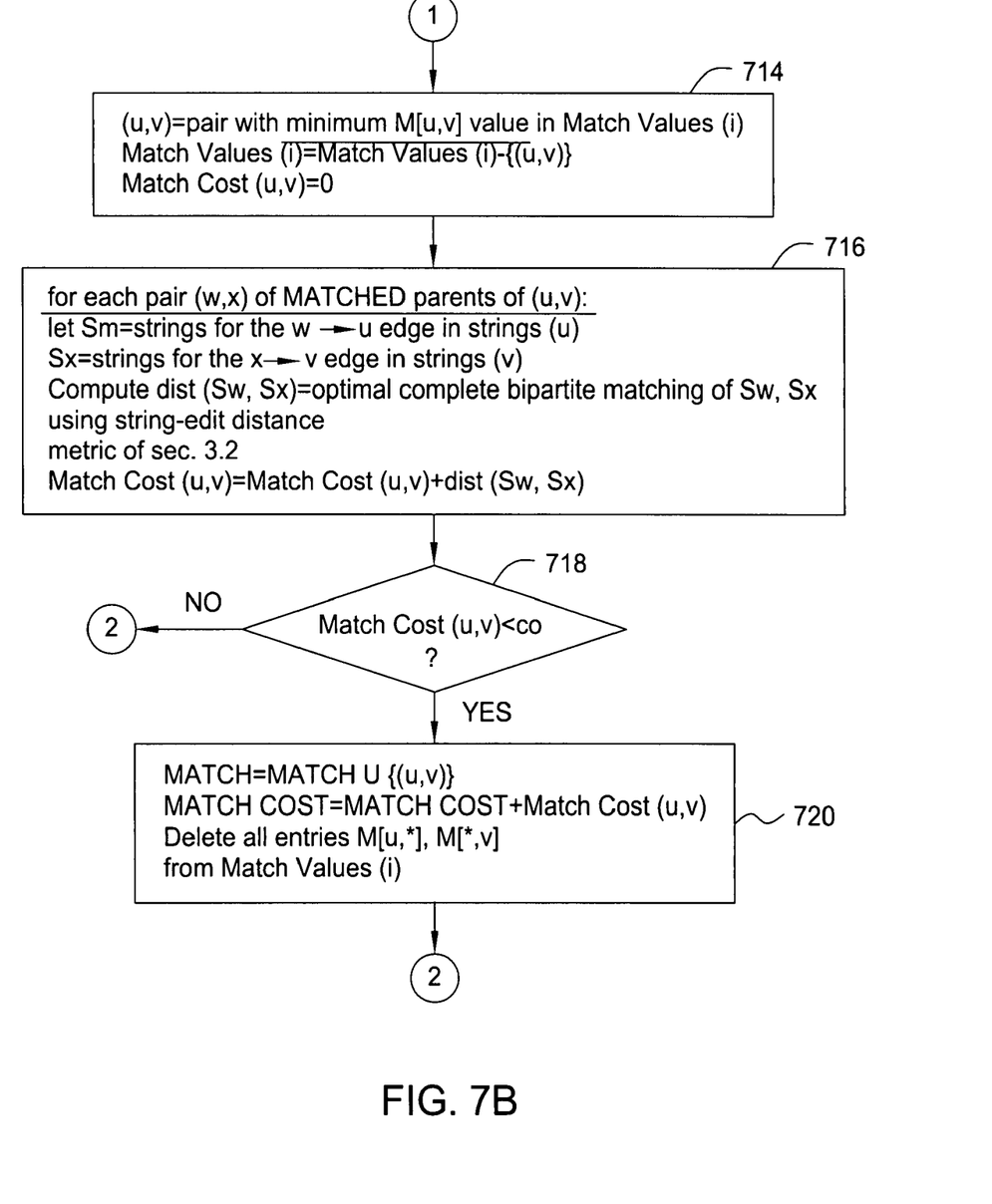
Figure 8:
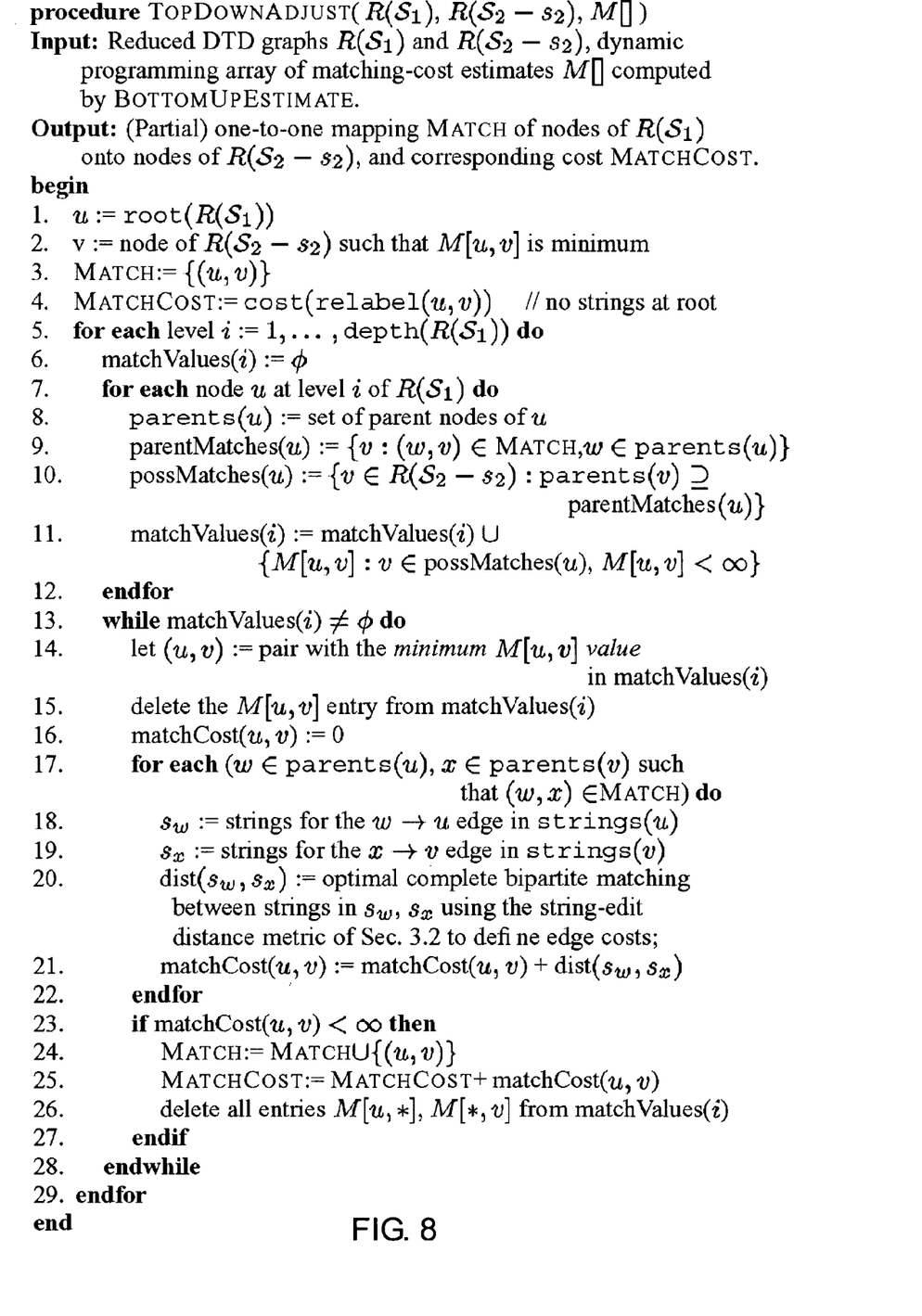
FIG. 8 depicts pseudo code corresponding to the second subroutine seen in FIG. 7.

The TOPDOWNADJUST step 410 is seen in greater detail in FIG. 7 as method steps 700 and one example of practicing same is seen in the corresponding pseudo code in FIG. 8. TOPDOWNADJUST 700 starts at step 702 and proceeds top-down, level-by-level along the two input graphs and, at each level, tries to match nodes in the two reduced DAGs using the computed dynamic-programming array M□ of cost estimates (returned by BOTTOMUPESTIMATE 500), while guaranteeing that ancestor-descendant relationships are preserved for already-matched nodes. TOPDOWNADJUST 700, in step 704, selects the best match for the root node of the source reduced graph R(S1) in the target reduced graph R(S2-s2) based on the computed matching cost estimates in M□ (also seen in Steps 1-4 of FIG. 8). At step 706, the depth level of source reduced graph R(S1) is checked against the current level i. If the condition is false, the method moves to step 708 to return a value for MATCH and MATCHCOST. If the condition is true, the method moves to step 709 where, so long as matchValues(i)≠0 in decision step 710, for each level i in R(S1), each node u∈R(S1) at this level is examined and all the potential matches v∈R(S2-s2) are discovered for node u, as well as the corresponding cost estimates M[u,v] (stored in "matchValues(i)" (also seen in Steps 7-12 of FIG. 8).

At step 714, the pairs of matching nodes for level i are determined by selecting the pairs with the best (i.e., smallest) matching costs from the "matchValues(i)" set (also see Step 14 of FIG. 8). At step 716, for each such (u,v) pair selected, the value of the actual string-matching cost "matchCost(u,v)" is computed based on the matching between u and v's parents (also see Steps 16-21 of FIG. 8). If that cost is finite (i.e., strings(u) is "embeddable" in strings(v) given the parent matchings) as per decision step 718, the (u,v) pair enters the matching and the matching cost is updated at step 720 (also see Steps 22-26 of FIG. 8). Of course, to ensure that the final mapping is one-to-one, once a pair (u,v) is added to the matching, all entries of the form M[u,*],M[*,v] (where "*" means any node), i.e., all other possible matchings for u and v, are removed from "matchValues(i)" (also see Step 25 of FIG. 8).

At the end of TOPDOWNADJUST 700, MATCH contains the final set of matching node pairs from the reduced graphs R(S1) and R(S2-s2), and MATCHCOST gives the corresponding cumulative matching cost (that is returned as an estimate for the cost of the s2 marking of S2). Note that the final (partial) DTD-embedding mapping f( ) between element types in S1 and S2-s2 must be determined through the individual string matchings computed inside TOPDOWNADJUST 700 (i.e., the string edit distance computations in Step 20). Annotation mapping ann( ) is omitted as it can be easily extracted from the output marking.

Experimentation was conducted with APPROXDAGMATCH using a DTD-schema from the XMark synthetic XML data benchmark [32], intended to model the activities of an on-line auction site. The XMark auction DTD was normalized, giving rise to a fairly complex DAG structure involving several conjunctive, disjunctive, and star productions. The (normalized) XMark DTD SXMark was used as a source DTD-schema, which has 72 nodes and 116 edges. To obtain target DTDs St of varying complexity, the method applies a script of random perturbations and insertions that either modify or impose additional structure on SXMark to form a target St. The random modification process ensures that, in each case, the "information capacity" of is at least as large as that of SXMark, that is, the structure of SXMark is embeddable in St. Target DTDs St of different complexity were generated by varying the length of the random-modification script, so that the number of nodes in St varies from |St|=1.1·|SXMark| up to |St|=1.3·|SXMark|. In each case, APPROXDAGMATCH implementation was run to try to discover an embedding mapping from SXMark to St.

For the purposes of this study, the random-modification scripts ensured that all the labels in the source SXMark are preserved in St (under possibly different DTD structures), while newly-introduced nodes of St were given labels with a minimum similarity value of 0 to already-existing labels in SXMark. Similarly, any label in SXMark was given similarity value of 0 to all other labels and, of course, a similarity value of 1 to itself. This 0/1 similarity scheme allowed for a very simple way of computing the objective value for the optimal SXMark-to-St embedding mapping, namely |SXMark| (i.e., the mapping that maps each node in SXMark to the corresponding node of St) while, at the same time, demonstrating the ability of APPROXDAGMATCH correctly identify and match embeddable DTD sub-structures. The timing and solution-quality numbers presented below are indicative of the results obtained over a variety of randomly-generated target DTDs St. In Table 1, the running time of APPROXDAGMATCH is presented as the number of nodes in the target DTD St is varied from |St|=1.1·|SXMark| up to |St|=1.3·|SXMark|. In each of the experiments, APPROXDAGMATCH returned the optimal source to target DTD-embedding (of size |SXMark|).

TABLE 1

| Target-Source Ratio | Running Time (minutes) |
| --- | --- |
| 1.1 | 18.05 |
| 1.15 | 24.37 |
| 1.20 | 26.53 |
| 1.25 | 50.11 |
| 1.30 | 62.01 |

Figure 9:
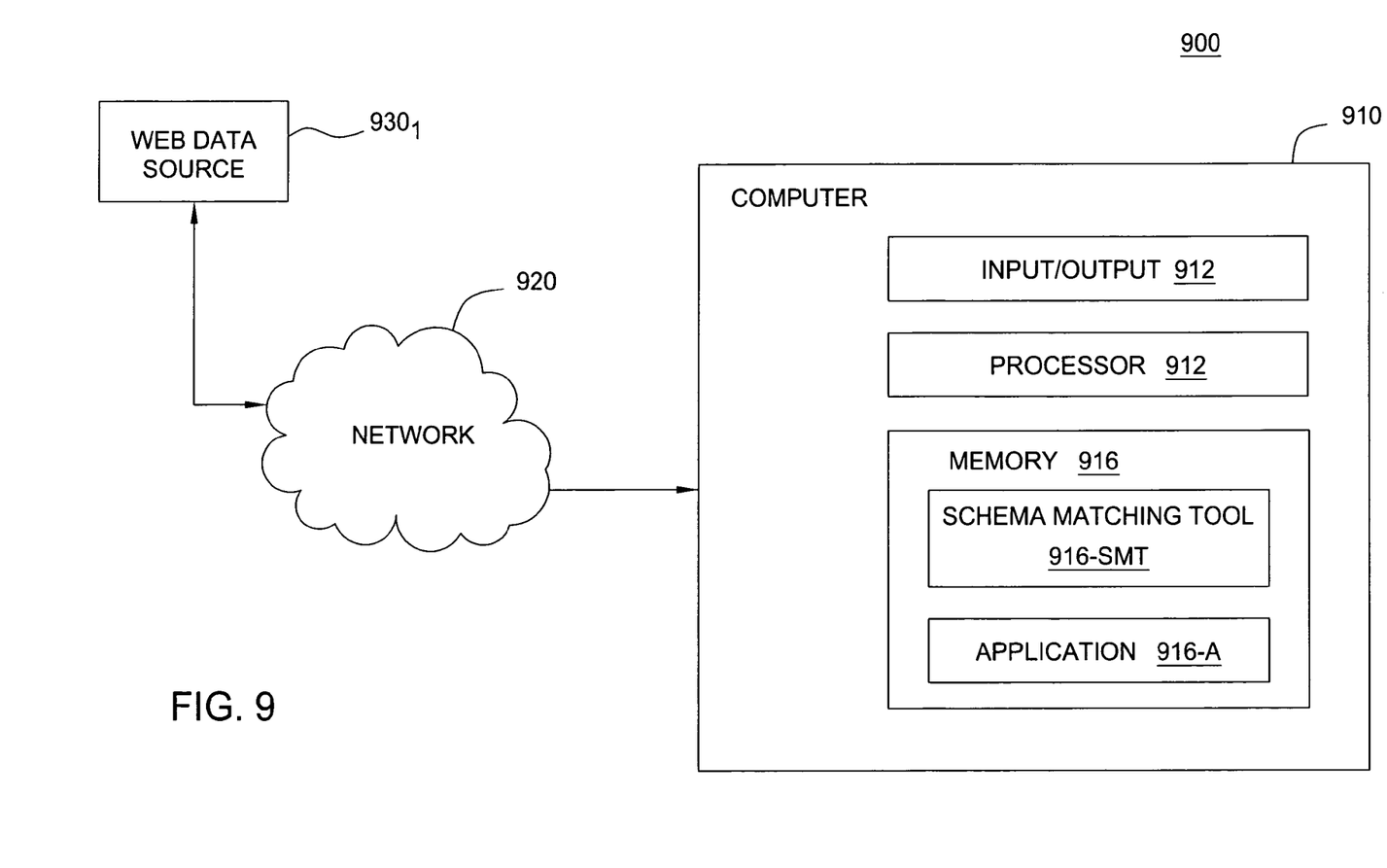
FIG. 9 depicts a high level block diagram of a computer system cooperating with a network such as the Internet.

FIG. 9 depicts a high level block diagram of a computer system cooperating with a network such as the Internet. Specifically, the system 900 of FIG. 9 comprises a computer 910 interacting with a web data source 930 via a network 920. The computer 910 is a general-purpose computer suitable for use in performing the functions described herein and comprises a processor element 914 (e.g., a CPU), a memory 916 (e.g., random access memory (RAM) and/or read only memory (ROM) and the like) and input/output devices 912 (e.g., storage devices, including but not limited to, a tape drive, a floppy drive, a hard disk drive or a compact disk drive, a receiver, a transmitter, a speaker, a display, an output port and/or user input devices such as a keyboard, a keypad, a mouse, and the like). The system 900 of FIG. 9 as described thus far is entirely conventional.

The network 920 comprises a standard network supporting the world wide web (WWW), such as the Internet. Interactions between a computer such as computer 910 and a Web site such as Web a data source 930 are facilitated by XML, HTML and other standard protocols and languages, such as well known to those skilled in the art.

The memory 916 of the computer 910 also includes a schema matching tool 916-SMT and at least one application program 916-A, which operate as described above with respect to the various figures.

It should be noted that the present invention may be implemented in software and/or in a combination of software and hardware, a general purpose computer or any other hardware equivalents. In one embodiment, software stored in the memory 916 were retrieved from a source external to the computer 910 can be loaded into memory 916 and executed by processor 914 to implement the functions as discussed above.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments that incorporate the teachings of the present invention have been shown and described in detail herein, those skilled in the art can readily devise many other varied embodiments that still incorporate these teachings.

We claim:

1. A method for performing information-preserving DTD (Document Type Definition) schema embeddings between a source schema and a target schema, comprising:

finding each DTD-legal string of the target, schema, wherein each of the source schema and the target schema comprise a Directed Acyelie Graph (DAG) DTD, wherein a DTD-legal string is a string, where after deleting all marked string nodes in the string at levels>_i, a node at level i-1 satisfies at least conditions of:
  (a) determining that a production of the node does not contain both conjunctive and disjunctive edge,
  (b) determining that where the node was originally a conjunctive node before the deletions, the deletions do not cause two or more disjunctive nodes to be merged into the node, and
  (c) determining that where the node was originally a disjunctive node before the deletions, the deletions do not cause two or more conjunctive nodes to be merged into the node;

determining, for each DTD-legal string, a bottom-up estimate of DAG substructure root nodes in reduced DTD graphs to provide thereby initial estimates of the best cumulative edit distances of the relevant DAG substructures;

determining a top down adjustment of the initial estimates to provide thereby a one to one matching value and corresponding match costs; and estimating a minimal match cost in memory, wherein the minimal match cost is the smallest among the match costs.

2. The method of claim 1 wherein the step of finding further comprises:

determining from a sequence of nodes comprising the target schema, a maximal sequence of tree nodes starting from a first node whose parent is either a root or a node having more than one children and ending at a node having more than one children; wherein each intermediate node therebetween has one child, thereby the determined maximal sequence of nodes forms a string.

3. The method of claim 1 where the top down adjustment comprises preparing a best cumulative edit distance of the first string of the target schema and a first string of the source schema routed at respective same level nodes.

4. The method of claim 3 wherein the preparing of the best cumulative edit distance further comprises:
  (a) checking that input nodes from a reduced source schema graph and a reduced target schema graph are at the same level;
  (b) producing an estimate of the cost of matching sets of strings corresponding to the input nodes; and
  (c) comparing out-degree values for the input nodes.

5. The method of claim 4 wherein the cost estimate is computed by finding a first optimal complete bipartite matching between the sets of strings.

6. The method of claim 5 wherein if the out-degree values for the input nodes equal zero, then the edit distance equals the first optimal complete bipartite matching between the sets of strings.

7. The method of claim 5 wherein if the out-degree values for the input nodes do not equal zero, then the edit distance is computed by performing a second complete bipartite matching is solved.

8. The method of claim 7 wherein the second complete bipartite matching determines the best way of matching the input nodes' children using recursively computed cost estimates.

9. The method of claim 1 wherein the determining a top down adjustment step further comprises taking the minimal match cost of the determining step and evaluating parent nodes of the same level input nodes.

10. The method of claim 9 wherein if the parent node evaluation results in a finite cost, the same level input nodes enter a matching and the estimated minimal match cost is updated.

* * * * *

UNITED STATES PATENT AND TRADEMARK OFFICE
CERTIFICATE OF CORRECTION

PATENT NO.        : 7,496,571 B2                                            Page 1 of 1
APPLICATION NO.   : 10/955322
DATED             : February 24, 2009
INVENTOR(S)       : Michael Abraham Benedikt et al.

It is certified that error appears in the above-identified patent and that said Letters Patent is hereby corrected as shown below:

Column 13, line 5, in claim 1, delete the "," after "target".

Column 13, line 7, in claim 1, delete "Acyelie" and insert instead --Acyclic--.

Column 13, line 9, in claim 1, delete "levels>_i," and insert instead --levels $\geq$ i,--.

Column 13, line 12, in claim 1, delete "edge" and insert instead --edges--.

Signed and Sealed this

Thirty-first Day of March, 2009

JOHN DOLL
*Acting Director of the United States Patent and Trademark Office*